Nov. 21, 1961   C. H. JONES ET AL   3,010,105
ELECTRICAL LOBING OF ANTENNA FEED
Filed Oct. 6, 1949   2 Sheets-Sheet 2
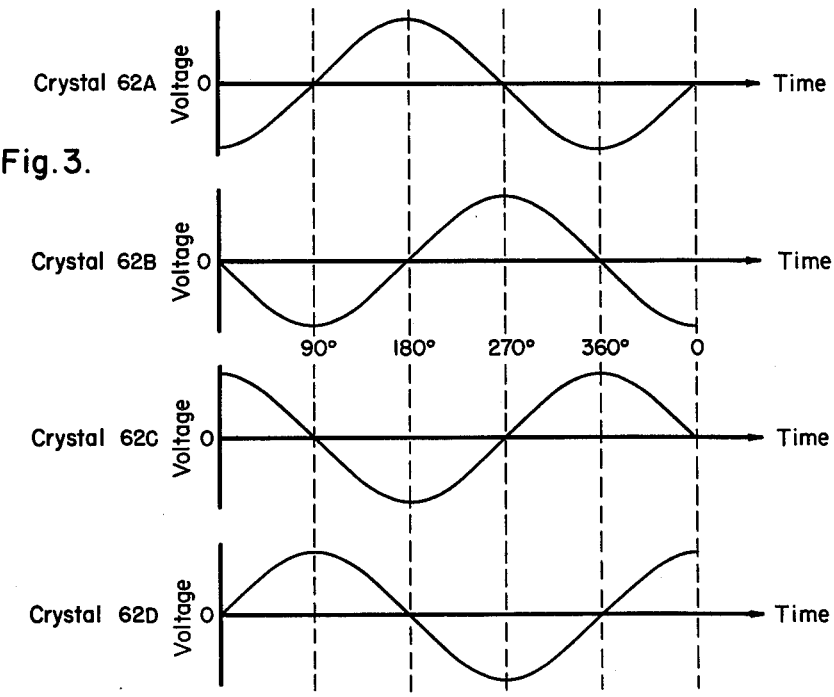
Fig. 3.
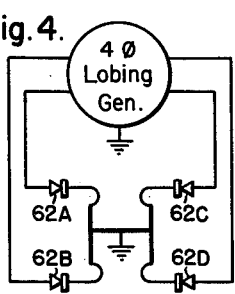
Fig. 4.
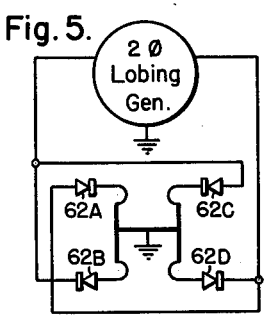
Fig. 5.
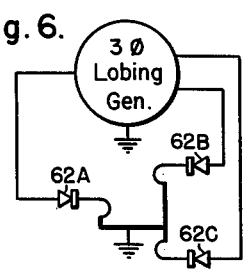
Fig. 6.
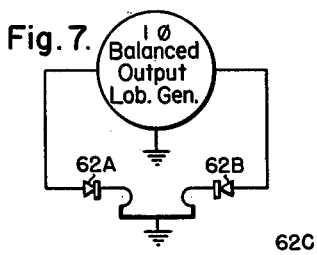
Fig. 7.
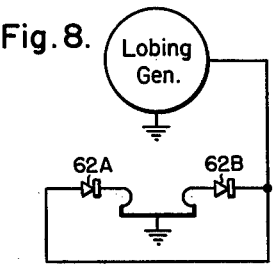
Fig. 8.
Fig. 10.
WITNESSES:
Robert C. Baird
James F. Young
INVENTORS
Charles H. Jones &
William E. Good.
BY
F. E. Browder
ATTORNEY

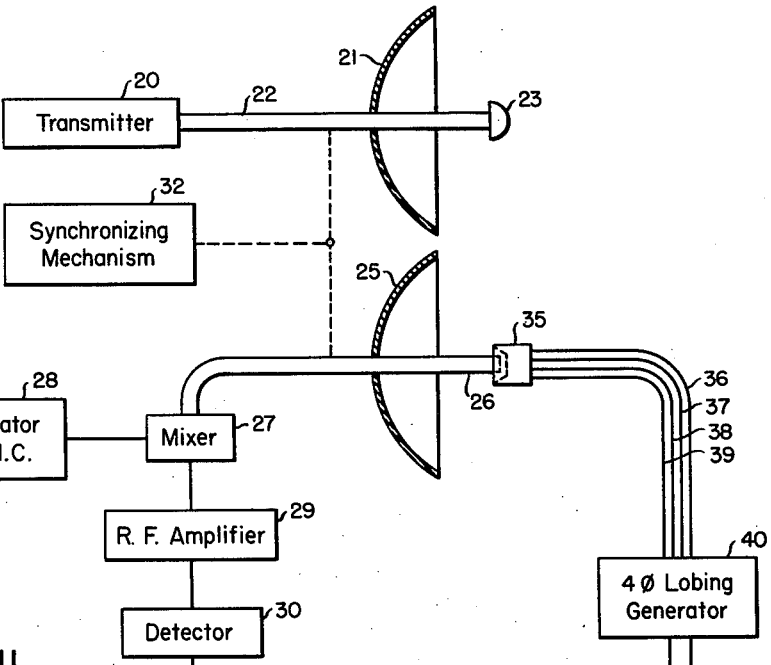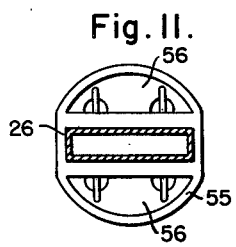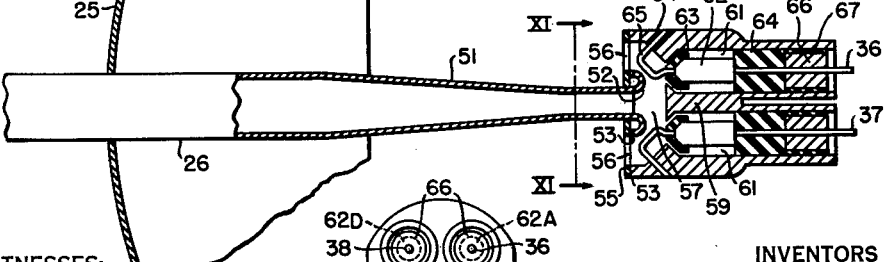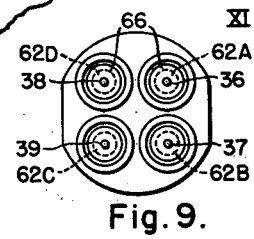

United States Patent Office 3,010,105
Patented Nov. 21, 1961

3,010,105
ELECTRICAL LOBING OF ANTENNA FEED
Charles H. Jones, Pittsburgh, and William E. Good, Murrysville, Pa., assignors to Westinghouse Electric Corporation, East Pittsburgh, Pa., a corporation of Pennsylvania
Filed Oct. 6, 1949, Ser. No. 119,937
6 Claims. (Cl. 343—754)

This invention relates to radar apparatus and more particularly to radar apparatus for obtaining azimuth, range and elevation information relative to an object located in space.

It is an object to provide improved apparatus of the type described.

In radar apparatus, it is generally desirable to obtain not only the range of a target located in space but also its position in azimuth and elevation. This is usually accomplished with antenna systems using paraboloidal reflectors by a process sometimes called lobing or lobe switching of the radar antenna beam. Lobe switching accomplishes rotation of the axis of the narrow lobe or beam of the antenna in a circular or spiral manner at an audio frequency rate. The lobe axis describes a cone in space around the axis of the reflector. If the target is not exactly on the axis of rotation of the beam, the received signal from the target will be amplitude modulated. The phase of this modulation, when compared to a reference potential, will tell the operator of the radar apparatus the direction in which the antenna must be moved in order to point the axis of the antenna directly at the target. In some radar applications, only azimuth and range of the target is required so the beam is simply moved from left to right and back again. Either the transmitting or the receiving antenna of the radar apparatus, or both, may be lobe switched.

Lobe switching is at present accomplished in several ways. The antenna lobe or beam pattern can be rotated by mechanical motion of part of the antenna. This can be accomplished by moving either the antenna feed or the antenna reflector. The antenna lobe may also be shifted back and forth by varying the frequency of the transmitted signal. However, this method is only practical in the case of azimuth determining apparatus. The antenna beam may also be rotated by providing three or more feeds for the reflector which are successively energized. For example, a micro-wave radar set might have four wave guides feeding either the transmitting or receiving paraboloidal reflector. The energy flow through these four wave guides may be varied in one of several ways. The four feeds may be modulated by some mechanical means such as moving an attenuator card in and out of wave guides.

Lobe switching of a radar antenna lobe or beam pattern by mechanical means is undesirable because of the vibrations produced, the lubricating problem and the wear of parts due to friction. If four wave guides are used to feed an antenna reflector that is ten wave lengths in diameter, the feed system will be very large and clumsy. Furthermore, it is also difficult to effectively pick up enough energy from the reflector and get it into four wave guides. Also, after modulation, the energy from the four wave guides must be combined in some way. All of these problems are difficult to satisfactorily solve in present lobe switching systems.

It is a further object of this invention to provide radar apparatus comprising a system for rapidly directing the main lobe or beam pattern of the transmitting or receiving antenna back and forth which eliminates the objections pointed out above to the systems of which we are aware.

It is a further object to provide radar apparatus comprising a receiving antenna and electrical means at the point where energy is collected from the receiving antenna for lobe switching the antenna beam pattern.

It is still a further object to provide radar apparatus comprising an antenna including a parabolic reflector and means for feeding energy from the reflector to a receiving system and an electrical system for lobe switching the antenna beam pattern at the point where energy is taken from the reflector and fed to the receiving system.

It is a further object to provide radar apparatus comprising an antenna including a reflector and means comprising crystals for lobe switching the antenna beam pattern.

It is a further object to provide improved radar apparatus comprising a transmitting system and a receiving antenna system and electrical means for lobe switching the antenna beam patterns.

These and other objects are effected by our invention as will be apparent from the following description and claims taken in connection with the drawings forming a part of this application, in which:

FIGURE 1 is a block diagram of a continuous wave radar system, comprising a transmitting and a receiving system, incorporating our invention;

FIG. 2 is a partial sectional view of the receiving antenna system illustrated in FIG. 1;

FIG. 3 is a family of curves illustrating the potentials on the lobe switching system which cause the receiving antenna beam pattern of FIG. 1 to be electrically moved or rotated;

FIG. 4 is a schematic illustration of the means for electrically lobe switching the antenna beam pattern of the system illustrated in FIGS. 1 and 2;

FIG. 5 is a schematic illustration of a two-phase electric system for effecting movement of the antenna beam pattern which may be used with the radar apparatus of FIG. 1;

FIG. 6 is a schematic illustration of a three-phase electric system for effecting movement of the antenna beam pattern of the apparatus of FIG. 1;

FIGS. 7 and 8 illustrate single-phase systems for effecting movement of the antenna beam pattern which may be used with the radar apparatus of FIG. 1 to provide either azimuth or elevation information;

FIG. 9 is a right end view of the energy collecting head system shown in FIG. 2;

FIG. 10 is a vector diagram illustrating the potentials of FIG. 3; and

FIG. 11 is a section taken on line XI—XI of FIG. 2.

Referring now to the drawings in detail, we illustrate in FIG. 1 a continuous wave radar, comprising a transmitting system and a receiving system, which is adapted to furnish range, azimuth and elevation information relative to a target located in space.

The transmitting system comprises a micro-wave transmitter 20 which may be of conventional design. Microwave energy generated by the transmitter 20 is fed to a parabolic reflector 21 through a wave guide 22 and the radiating system 23. The radiating system 23 is located at the focus of the reflector 21 and energy radiated by the system 23 is reflected in space in the form of a narrow lobe or beam by the reflector 21.

The receiving antenna system comprises a parabolic reflector 25 having a narrow main lobe or beam pattern and a wave guide 26 which connects to the receiver. The receiver comprises a mixer stage 27, a local oscillator 28 which also connects to the mixer 27, a radio frequency amplifier 29, a detector 30, and an audio amplifier 31.

The receiving system also comprises a system for electrically lobe switching or moving the received beam at the point where energy enters the wave guide 26. This system comprises an energy collecting head 35 located at substantially the focus of the reflector 25. The energy collecting head 35 is connected by four separate conductors 36, 37, 38 and 39 to a four-phase lobing generator 40. A pair of reference potentials is derived from the lobing generator 40 and fed into a reference generator 41.

The output from the audio amplifier 31 and the output from the reference signal generator 41 are fed into an azimuth phase comparator 44 and also into an elevation phase comparator 45. The azimuth phase comparator 44 is provided with an indicating meter 46, and the elevation phase comparator 45 is also provided with an indicating meter 47. The phase comparators 44 and 45 may be of a conventional known design of the type wherein the meter 46 will indicate whether the antenna is pointing directly at a target in space, or whether the antenna is pointing to the right or to the left of the target in space, and the meter 47 will indicate whether the antenna is pointing directly at or above or below the target.

The transmitting and receiving antenna systems are adapted to rotate through 360° in azimuth and they are kept in synchronism by a synchronizing mechanism 32. The systems also comprise means for shifting the antennas in elevation.

Referring to FIG. 2, it is seen that the receiving antenna system comprises the wave guide 26 having a tapered portion 51. The tapered portion 51 has a turned back flange 52 formed thereon. The energy collecting head 35 is attached by means of soft solder or the like at points 53 to the tapered end 51 of the wave guide 26. The energy collecting head 35 comprises a metal member 54 having a metal end cover 55 attached to the front thereof. The member 54 has a cavity or recess 57 therein between its front end and the cover 55. Two windows 56 are provided in the cover 55 to permit energy received by the reflector 25 to be directed into the cavity 57 which is provided between the inside of the hollow member 54 and the cover 55 of the energy collecting head assembly 35. A probe 59 extends into the cavity 57 so as to control the frequency of that cavity. The member 54 has four longitudinal cylindrical openings indicated by the reference characters 61 provided therein. A germanium crystal 62, such as the crystal known in the art as type 1N48, is located in each of the openings 61. Each of the crystals 62 is magnetically coupled into the receiver feed system by a small loop 65 which connects to the inside of the member 54 within the cavity 57. However, it is to be understood that each of the crystals 62 could, if desired, be electrically coupled into the cavity 57 by means of probes which would extend into the cavity 57. Insulating members 63 and 64 are provided at the front and rear, respectively, of each of the crystals 62 to properly position the crystals in the openings 61 and to electrically insulate each of the crystals 62 from the metal member 54. Nonmagnetic plugs 66 are inserted into each of the openings 61 behind each of the crystals 62 to retain the crystals 62 in place. Insulating material 67 surrounds each of the plugs 66 to insulate the plugs from the member 54. The rear ends of the crystals are connected to the four-phase lobing generator 40 through the electrical conductors 36, 37, 38 and 39, each of which is connected to one of the crystals 62. Exciting or modulating potentials are supplied to the crystals 62 from the lobing generator 40.

Assuming that energy radiated from the transmitting reflector 21 strikes an object located in space, the object will reradiate, reflect or scatter energy in the direction of the receiving reflector 25. This reradiated energy, upon striking the reflector 25, will be reflected through the windows 56 in the cover 55 of the energy collecting head assembly 35 and will pass into the cavity 57 between the turned back flange 52 and the loops 65 and will be directed into the tapered end 51 of the wave guide 26 which will conduct it to the receiving system. It is considered that there are four paths for the radio frequency energy to enter the wave guide, each path being obstructed by or containing a loop 65. In a conventional system, the output from the mixer 27, after being amplified and detected, would be applied to an indicator which would show that a target existed in space. This indication would not indicate whether the antenna 25 was pointed directly at the target; neither would it indicate the correct azimuth or elevation of the target. However, the system comprising the energy collecting head 35 and the lobing generator 40 rotates the far end of the antenna beam pattern or main lobe in a circle, and our indicating system indicates whether the antenna beam is pointed directly at the target or to right or to left of the target in azimuth, or directly at or above or below the target in elevation. This rotation of the axis of the beam about a circle or spiral is accomplished by applying a four-phase potential to the crystals 62 from the four-phase lobing generator 40. It is seen that at any instance the relative phase of the potentials on the crystals 62 will be represented by the family of curves illustrated in FIG. 3.

The crystals 62 because of the manner in which they are magnetically connected to the energy receiving head 35, through the loops 65, provide a variable impedance, during the exciting or modulating cycle, to the flow of radio frequency energy in each of the four paths which radio frequency energy must follow in order to get from the antenna reflector 25 into the tapered end 51 of the wave guide 26. When the crystals 62 are passing maximum forward current, the impedances will be such that minimum radio frequency energy will get past the respective loops 65. These impedances may be increased or decreased by increasing or decreasing the exciting or modulating potential on the respective crystals 62.

For the purpose of giving an example of how our system accomplishes lobe switching or rotation of the axis of the antenna beam pattern, the crystals 62 will be designated as 62A, 62B, 62C, and 62D (FIGS. 4, 9 and 10).

At the time when the negative potential on the crystal 62A (FIG. 9) is a maximum, the crystal 62A will pass current. Under this condition, the crystal 62A allows little radio frequency energy to go past its respective loop 65 into the tapered end 51 of the wave guide 26. In other words, the crystal 62A presents a high impedance to radio frequency energy entering the wave guide 26 past its respective loop 65. This causes the effective center of the energy received in the tapered end 51 of the wave guide 26 to be displaced toward the crystal 62C and the main lobe of the antenna beam pattern is displaced toward the crystal 62A. To further illustrate the method of rotation of the end of the antenna beam pattern, at the time when the potential on crystal 62A is zero, or 90° later, the negative potential on crystal 62B will be maximum and crystal 62B will pass current. Crystal 62B will allow little radio frequency energy to get past its respective loop 65 into the tapered end 51 of the wave guide 26, and the effective center of the main lobe of the antenna pattern is displaced toward crystal 62B. At the time when the potential on crystal 62A is maximum positive, or 180° later, the negative potential on crystal 62C will be maximum, and crystal 62C will pass current. Crystal 62C will allow little radio frequency energy to get past its respective loop 65 into the tapered end 51 of the wave guide 26 and the effective center of the main lobe of the antenna pattern is displaced toward crystal 62C. At the time when the potential on crystal 62A is again zero, or 270° later, the negative potential on crystal 62D will be maximum and crystal 62D will pass current. Crystal 62D will allow little radio frequency energy to get past its respective loop 65 into the tapered end 51 of the wave guide 26, and the effective center of the main lobe of the antenna pattern is displaced toward crystal 62D. From the examples just given, it is seen that as the time increases for each complete electrical cycle of 360° the effective center of the main lobe or beam of the antenna pattern will be rotated through 360°.

FIGURE 4 represents the schematic diagram of the four-phase lobing generator 40 and the system employing four crystals 62A, 62B, 62C and 62D such as we use in the radar system illustrated in FIG. 1. The frequency of the lobing generator 40 is in the audio frequency range. However, frequencies as high as one megacycle or higher may be used in our system.

FIG. 5 illustrates a two-phase lobing switching system which may be used satisfactorily to shift the beam back and forth if it is desired to use the radar system to determine range and azimuth only. This system uses four crystals and is similar to the lobe switching system illustrated in FIG. 4, except that the crystals 62B and 62D have been reversed in direction. FIG. 6 illustrates a three-phase lobe switching system using three crystals 62A, 62B and 62C which may be used satisfactorily in the manner described for FIG. 1 to determine azimuth and elevation.

FIGS. 7 and 8 illustrate single-phase lobe switching systems using two crystals 62A and 62B which may be used where it is desired to use the apparatus for determining azimuth only or elevation only.

FIG. 10 is a vector diagram of the potentials across the crystals 62A, 62B, 62C, and 62D, FIGS. 1 and 4, when the antenna reflector 25 is pointing directly at a target located in space.

While we have described our invention as being applied to a radar system of the continuous wave type wherein a separate antenna is used for transmitting and receiving, it is understood that it may also be applied to radar systems of the pulse type which utilize a single antenna for both transmitting and receiving.

From the foregoing description taken in connection with the drawings, it is seen that we have provided a radar system comprising an improved electronic lobing system which will effectively rotate the end of the antenna lobe or beam pattern about a circle or other desired configuration.

While we have shown our invention in several forms, it will be obvious to those skilled in the art that it is not so limited, but is susceptible of various changes and modifications without departing from the spirit thereof, and we desire, therefore, that only such limitations shall be placed thereupon as are specifically set forth in the appended claims.

We claim as our invention:

1. In a radar system, an antenna comprising a parabolic reflector, an energy collecting device located at approximately the focus of said reflector, means comprising crystals located at substantially the focus of said reflector and having probes connected to said crystals and extending into said energy collecting device, and means for exciting said crystals.

2. In a radar system, an antenna comprising a parabolic reflector, an energy collecting head located at the focus of said reflector, a wave guide connected to said energy collecting head for conducting energy from said head to a receiving system, said energy collecting head comprising a plurality of paths for conducting energy from said reflector into said wave guide, and means comprising a crystal for varying the impedance of each of said paths to the passage of radio frequency energy.

3. In a radar system, an antenna comprising a parabolic reflector, an energy collecting head located at substantially the focus of said reflector, a wave guide connecting to said energy collecting head for conducting energy to a receiving system, said energy collecting head comprising a plurality of paths for conducting energy from said antenna into said wave guide, said energy collecting head comprising means for varying the impedance to the passage of radio frequency energy into said wave guide, said impedance varying means comprising crystals and means for exciting said crystals.

4. In a radar system, an antenna comprising a parabolic reflector, an energy collecting head located at substantially the focus of said reflector, a wave guide connected to said energy collecting head for conducting energy to a receiving system, said energy collecting head comprising a plurality of paths for conducting energy from said reflector into said wave guide, means for varying the impedance to radio frequency energy of each of said paths, said means comprising crystals, each of said crystals being magnetically coupled to said energy collecting head by a loop extending into said paths, and means for exciting each of said crystals.

5. In a radar system, an antenna comprising a parabolic reflector, an energy collecting head located at substantially the focus of said reflector, a wave guide connected to said energy collecting head for conducting energy to a receiving system, said energy collecting head comprising a plurality of paths for conducting energy into said wave guide, means for varying the impedance of each of said paths comprising a crystal coupled into each of said paths, and means for exciting each of said crystals.

6. In a radar system, an antenna comprising a parabolic reflector, an energy collecting head located at the focus of said reflector, a conductor for electromagnetic oscillations connected to said energy collecting head for conducting energy from said head to a receiving system, said energy collecting head comprising a plurality of paths for conducting energy from said reflector into said conductor, and means comprising a crystal for varying the impedance of each of said paths to the passage of radio frequency energy.

References Cited in the file of this patent
UNITED STATES PATENTS

| | | |
|---|---|---|
| 2,407,250 | Busignies | Sept. 10, 1946 |
| 2,423,072 | Willoughby | June 24, 1947 |
| 2,460,326 | Woodruff | Feb. 1, 1949 |
| 2,488,419 | Lindenblad | Nov. 15, 1949 |